March 29, 1938.  J. LISOV  2,112,781
ANTISKID DEVICE AND EMERGENCY WHEEL
Filed Sept. 6, 1935
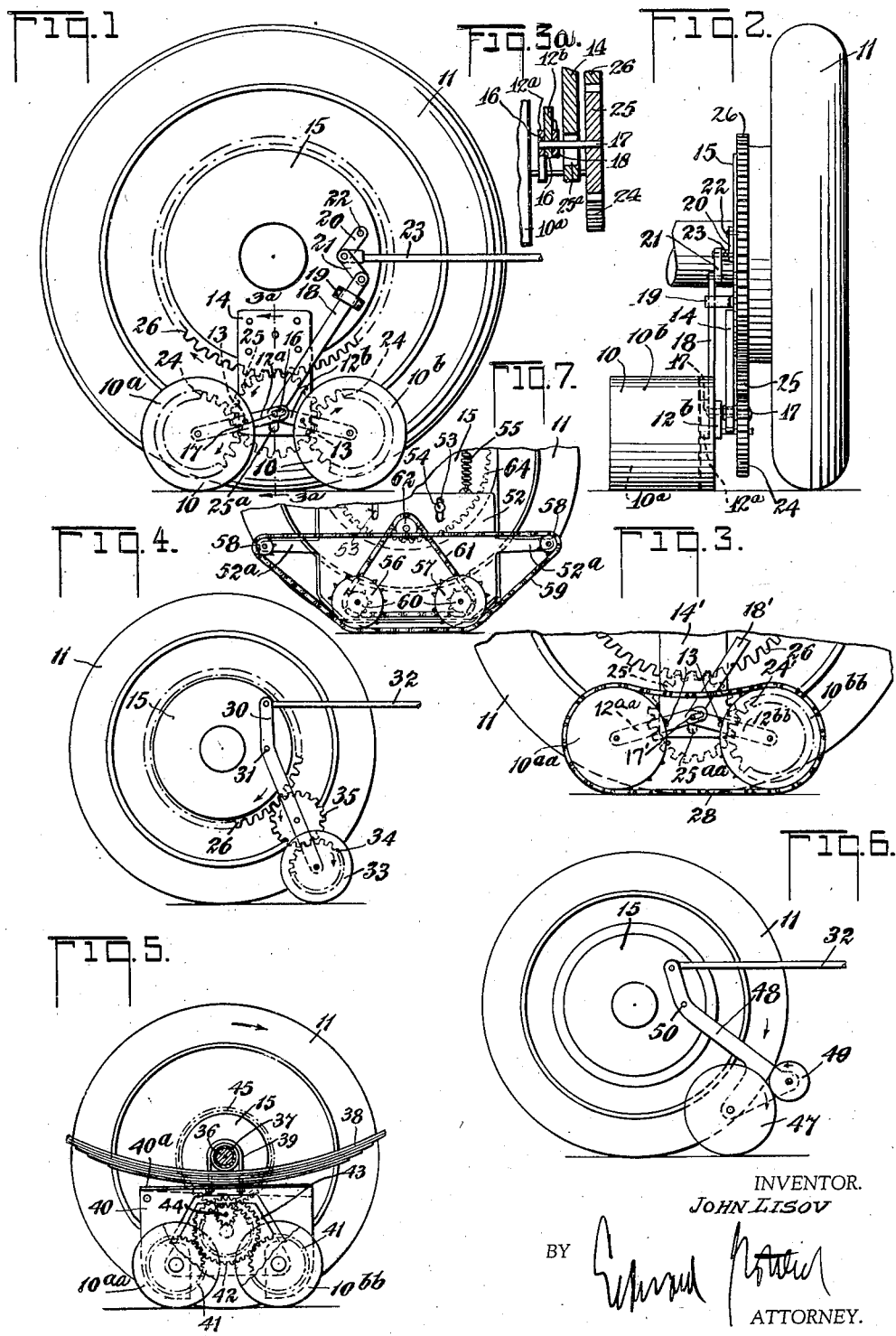
INVENTOR.
JOHN LISOV
BY
ATTORNEY.

Patented Mar. 29, 1938

2,112,781

UNITED STATES PATENT OFFICE 2,112,781

ANTISKID DEVICE AND EMERGENCY WHEEL

John Lisov, Montclair, N. J.

Application September 6, 1935, Serial No. 39,403

5 Claims. (Cl. 180—14)

This invention relates to new and useful improvements in an anti-skid device and emergency wheel.

The invention has for an object the construction of a device as mentioned which is characterized by a traction device for engaging the ground adapted to be supported adjacent the wheel of a vehicle and driven at the same linear speed as the peripheral speed of said wheel.

The advantage of operating the traction device at the same peripheral linear speed as the peripheral linear speed of the wheel resides in the fact that any tendency of grinding of the traction device and the ground will be eliminated. Because of the elimination of grinding it will be possible to operate the traction device over long distances. Thus, it may be used as an emergency wheel in cases where the tire of the wheel becomes flat, and it is desired to reach a service station, or in cases where the vehicle is overloaded or travelling on soft ground or snow. In the latter events, the traction device will act as a duo wheel.

It is a further object of this invention to so construct the device that it is driven by power. Another embodiment is to construct the device so that it is frictionally driven by association with some turning part, such as the wheel itself.

A further object of the invention is to so arrange the traction device that it may be engaged with the ground and lifted from the ground at will. Thus, it may be used as an emergency device.

A further object of the invention resides in various forms of the traction device itself. In one form it is proposed to have one roller as the traction device. In another form it is proposed to use a pair of rollers in tandem. In still another form it is proposed to construct the traction device similar to a caterpillar tractor. I greatly prefer this latter form as it is the most efficient in avoiding or braking a skid.

Another object is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features are more particularly set forth.

In the accompanying drawing forming a material part of this disclosure:—

Fig. 1 is an elevational view of an anti-skid device and emergency wheel constructed according to this invention, and shown applied to a wheel.

Fig. 2 is an end view of Fig. 1 looking from the right hand end.

Fig. 3 is a fragmentary view similar to a portion of Fig. 1, but illustrating a modified form.

Fig. 3a is a fragmentary enlarged sectional view taken on the line 3a—3a of Fig. 1.

Fig. 4 is an elevational view of an anti-skid and emergency wheel constructed according to another embodiment of the invention.

Fig. 5 is an elevational view of another modified form of the device.

Fig. 6 is an elevational view of a still further modified form of the device.

Fig. 7 is a fragmentary elevational view of still another form of the device.

The anti-skid device and emergency wheel consists primarily of a traction device 10 for engaging the ground and adapted to be supported adjacent the wheel 11 of a vehicle (not shown) and driven at the same linear peripheral speed as said wheel. In the form of the invention shown in Figs. 1 and 2 the traction device comprises a pair of rollers 10a and 10b located in tandem. The rollers 10a and 10b are mounted on levers 12a and 12b which are each pivotally mounted intermediate of their ends by pintles 13 upon a support plate 14 which is fixedly attached upon the stationary cover 15 of the customary brake drum of the wheel 11.

The rollers 10a and 10b are mounted on the outer ends of the levers. The inner ends of the levers are formed with slots 16 which are engaged by a pin 17, which extends through a slot 25a in the support plate 14 and which is mounted upon a lever 18 which is, in turn, adapted to be moved for the purpose of pivoting the levers 12a and 12b to engage the rollers against the ground or to lift the rollers from the ground and also to disengage a gear 25 from a gear 26 as hereinafter described. The lever 18 is slidably mounted in a bearing 19 which is supported on the cover plate 15. A pair of links 20 and 21 are pivotally connected at one of their ends. The other end of the link 20 is pivotally connected by a pintle 22 with the cover plate 15. The other end of the link 21 is pivotally connected with the end of the lever 18.

An operating rod 23 is pivotally connected with the junction of the links 21 and 22. It should be noted that when the rod 23 is drawn towards the right the lever 18 will be moved downwards which will pivot upwards the ends of the levers 12a and 12b which carries the rollers. Thus, the rollers are moved out of contact with the ground. While this particular means is illustrated for lifting the rollers, which is a preferred means, other means may also be used for accomplishing the same purpose.

The rollers 10a and 10b are driven at the same linear peripheral speeds as the wheel peripheral speed. This driving means comprises gears 24 fixed upon the spindles of the rollers. These gears 24 are of the same size, and mesh with said gear 25, which meshes with said large gear 26 which is fixed upon a turning part such as the wheel 11. The pin 17 rotatively supports the gear 25 which disengages from the gear 26 when the levers 12a and 12b are moved to raise the rollers from the ground. Thus, rotations from the wheel will turn the gear 26, which in turn rotates the gear 25 rotating the gears 24. The gears are so designed that the linear speed of the peripheries of the rollers are identical to the linear speed of the periphery of the wheel 11.

In Fig. 3 another embodiment of the invention is disclosed which distinguishes from the prior form merely in the traction device. This traction device consists of a pair of toothed rollers 10aa and 10bb substituted for the rollers 10a and 10b. Only one of the rollers, such as roller 10bb, is provided with the gear 24' meshing with gear 25' on the pin 17' carried by the lever 18'. The pin 17' works in a slot 25aa in the plate 14'. The levers 12aa and 12bb support the rollers. An endless caterpillar tractor chain 28 is engaged over the rollers 10aa and 10bb. With the use of this tractor device the probability of skidding is greatly reduced. The chain 28 engages the ground and will be capable of breaking ice and securing a firm grip.

In Fig. 4 another embodiment of the invention is disclosed in which the tractor device comprises a single roller. More particularly, there is a lever 30 pivotally mounted by the pintle 31 intermediate of its ends upon the brake drum cover plate 15 of the brake of the wheel 11. The lever 30 is operated by a rod 32 which extends to the vicinity of the operator and is moved by conventional means, such as a foot pedal or hand lever (not illustrated on the drawing). On the lower end of the lever 30 there is rotatively mounted the traction device or single roller 33.

A gear 34 is coaxially fixed with the roller 33 and meshes with an idler gear 35 rotatively supported on the lever 30. The idler gear 35 meshes with the drive gear 26 secured upon a rotating part, or the wheel. In this form of the invention the traction device may be engaged against the ground when desired, or lifted free from the ground. The gears 26, 34 and 35 should be designed so that the roller 33 is driven at the same linear peripheral speed as the wheel 11.

In Fig. 5 another embodiment of the invention is disclosed. In this form the wheel 11 is mounted on the conventional wheel axle 36 mounted within the transmission casing 37 to which the disc 15 is secured. The spring 38 of the motor of the vehicle (not illustrated on the drawing) is shown secured by a bolt 39 to the transmission casing. In this form of the invention the traction device consists of a pair of rollers 10aa and 10bb in tandem and engaging the ground—there being no provision for lifting the rollers out of contact with the ground. These rollers are rotatively supported on a support plate 40 which has a top flange 40a by which it is attached with the bolts 39 to the transmission casing.

Spur gears 41 are fixed coaxially to the rollers 10aa and 10bb and mesh with a ring gear 42 which has external teeth and internal teeth. The gears 41 mesh with the external teeth. The ring gear 42 is rotatively supported on a plate 43 which is attached on the cover 15. A pinion 44 is rotatively supported on the plate 43 and has two sections; one section meshing with the internal teeth of the gear 42 and the other section meshing with the teeth of a gear 45 which is attached upon the wheel, or a co-related rotating part. The gears are so designed that the rollers are driven at the same linear peripheral speed as the wheel. Rotations from the gear 45 serve to rotate the pinion 44, which in turn, rotates the ring gear 42. Rotations from the ring gear are transmitted to the gears 41 and hence to the rollers 10aa and 10bb.

In Fig. 6 another form of the invention is disclosed in which the driving means of the traction device is a frictional one. More particularly, the traction device comprises a roller 47 for engaging the ground and which is rotatively supported on the lower end of a lever 48. This lever also supports a roller 49 which is adapted to have a portion thereof placed in intimate contact with the wheel 11 and which also engages against the roller 47 to drive the latter. Motion is thus transmitted from the wheel 11 to the roller 49 and from the roller 49 to the roller 47. The lever 48 is pivotally supported by a pintle 50 to the cover plate 15. The lever 48 is operated by a rod 32. The friction drive 49 is so designed that the roller 47 will be driven at the same linear peripheral speed as the wheel 11. The lever 48 is pivoted to lift the traction device 47 out of contact with the ground and to simultaneously move the friction drive 49 out of contact with the wheel 11, when the lower end of the lever 48 is moved upwards in an arc about the pivot 50.

In Fig. 7 another modified form of the invention is disclosed. In this form a sturdy and substantial caterpillar tractor chain is used. This form is intended for heavy trucks and buses. More particularly, there is a support plate 52 which is adjustably supported on the cover plate 15 of the brake drum of the wheel 11. There are several slots 53 in the plate 52 which are engaged by bolts 54 from the plate 15 to provide the sliding connection. Springs 55 normally urge the support plate 52 in a raised position. A mechanism (not shown on the drawing and forming no part of this invention) may be supplied for lowering the plate 52 when it is desired to engage the traction device with the ground.

The traction device consists of a pair of toothed rollers 56 and 57 which are rotatively supported on the plate 52. The plate 52 has arms 52a which rotatively support sprockets 58. A caterpillar traction chain 59 is engaged over the sprockets 58 and under the toothed rollers 56 and 57. A portion of this traction chain is adapted to engage the ground. Sprockets 60 are mounted upon the axles of the rollers 56 and 57 and are engaged by a drive chain 61 which meshes with a pinion 62 rotatively supported on the plate 52. The pinion 62 is provided with a section meshing with an internal gear 64 upon or connected with the wheel 11.

Thus, rotations from the wheel 11 serve to drive the pinion 62 from which the rotations are transmitted by the chain 61 and the sprocket 60 to the rollers 56 and 57. The parts should be so designed that the linear speed of the traction chain 59 is equal to the linear peripheral speed of the wheel 11. The traction device may then be used as an emergency wheel. It may also be used as an anti-skid device for occasional use when desired.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. An anti-skid device and emergency wheel for vehicles, comprising a gear adapted to be fixed coaxially on one of the wheels of said vehicle, a support adapted to be attached upon a stationary portion of said vehicle and having a slot, a pin extending through said slot, a pinion rotative on said pin and meshing with said gear, a pair of levers pivotally mounted on said support and extending in opposite directions and at their inner ends having slots through which said pin passes, rotative traction elements mounted on the outer ends of said levers, gears coaxially fixed on said traction elements and meshing with said pinion, and means for moving said pin to move said pinion out of mesh with said gear and simultaneously shifting said pair of levers to lift said traction elements.

2. An anti-skid device and emergency wheel for vehicles, comprising a gear adapted to be fixed coaxially on one of the wheels of said vehicle, a support adapted to be attached upon a stationary portion of said vehicle and having a slot, a pin extending through said slot, a pinion rotative on said pin and meshing with said gear, a pair of levers pivotally mounted on said support and extending in opposite directions and at their inner ends having slots through which said pin passes, rotative traction elements mounted on the outer ends of said levers, gears coaxially fixed on said traction elements and meshing with said pinion, and means for moving said pin to move said pinion out of mesh with said gear and simultaneously shifting said pair of levers to lift said traction elements, comprising a lever slidably mounted and connected at one end with said pin, a toggle construction for moving said lever, and a rod for moving said toggle.

3. An anti-skid device and emergency wheel for vehicles, comprising a main gear adapted to be fixed coaxially on one of the wheels of said vehicle, a support adapted to be attached upon a stationary portion of said vehicle, a pair of levers pivotally mounted on said support and extending in opposite directions, rotative traction elements mounted on the outer ends of said levers, gears coaxially fixed on said traction elements, a gear meshing with said gears and with said main gear when said traction elements engage the ground, means for pivoting said levers for lifting said traction elements from the ground, and means acting simultaneously with said latter mentioned means for moving said gear out of mesh with said main gear.

4. An anti-skid device and emergency wheel for vehicles, comprising a main gear adapted to be fixed coaxially on one of the wheels of said vehicle, a support adapted to be attached upon a stationary portion of said vehicle, a pair of levers pivotally mounted on said support and extending in opposite directions, rotative traction elements mounted on the outer ends of said levers, gears coaxially fixed on said traction elements, a gear meshing with said gears and with said main gear when said traction elements engage the ground, means for pivoting said levers for lifting said traction elements from the ground, and means acting simultaneously with said latter mentioned means for moving said gear out of mesh with said main gear, said means for pivoting said levers comprising a lever slidably mounted and adapted to be supported upon a stationary portion of said vehicle, a pin mounted on said lever and engaging slots in the inner ends of said pairs of levers, and means for moving said lever.

5. An anti-skid device and emergency wheel for vehicles, comprising a main gear adapted to be fixed coaxially on one of the wheels of said vehicle, a support adapted to be attached upon a stationary portion of said vehicle, a pair of levers pivotally mounted on said support and extending in opposite directions, rotative traction elements mounted on the outer ends of said levers, gears coaxially fixed on said traction elements, a gear meshing with said gears and with said main gear when said traction elements engage the ground, means for pivoting said levers for lifting said traction elements from the ground, said means for pivoting said levers comprising a lever slidably mounted and adapted to be supported upon a stationary portion of said vehicle, a pin mounted on said lever and engaging slots in the inner ends of said pairs of levers, and means for moving said lever, and said gear being rotatively supported by said pin, whereby it moves out of contact with said main gear when said pin moves to pivot said levers.

JOHN LISOV.